United States Patent
Dwarakanath et al.

(10) Patent No.: US 9,752,071 B2
(45) Date of Patent: Sep. 5, 2017

(54) COMPOSITION AND METHOD FOR REMEDIATION OF NEAR WELLBORE DAMAGE

(71) Applicant: Chevron U.S.A. Inc., San Ramon, CA (US)

(72) Inventors: Varadarajan Dwarakanath, Houston, TX (US); Robert Matthew Dean, Houston, TX (US); Will S. Slaughter, Houston, TX (US); Dustin Luke Walker, Katy, TX (US); Sophany Thach, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 365 days.

(21) Appl. No.: 14/208,685

(22) Filed: Mar. 13, 2014

(65) Prior Publication Data

US 2014/0262286 A1    Sep. 18, 2014

Related U.S. Application Data

(60) Provisional application No. 61/800,386, filed on Mar. 15, 2013.

(51) Int. Cl.
*E21B 43/16* (2006.01)
*C09K 8/58* (2006.01)
(Continued)

(52) U.S. Cl.
CPC ............... *C09K 8/58* (2013.01); *C09K 8/032* (2013.01); *C09K 8/52* (2013.01); *E21B 43/16* (2013.01)

(58) Field of Classification Search
CPC .. C09K 8/58; C09K 8/032; C09K 8/52; E21B 43/16
(Continued)

(56) References Cited

U.S. PATENT DOCUMENTS

| 4,502,538 A |   | 3/1985 | Wellington et al. |
| 5,068,043 A | * | 11/1991 | Thigpen ............... C09K 8/584 |
|  |  |  | 166/270.1 |

(Continued)

FOREIGN PATENT DOCUMENTS

| GB | 2417044 B | 7/2008 |
| GB | 2432177 B | 5/2009 |

(Continued)

OTHER PUBLICATIONS

Barnes, Julian R., et al.; "Application of Internal Olefin Sulfonates and Other Surfactants to EOR. Part 1: Structure—Performance Relationships for Selection at Different Reservoir Conditions"; SPE 129766, Apr. 2010, pp. 1-16.

(Continued)

*Primary Examiner* — Doug Hutton, Jr.
*Assistant Examiner* — Silvana Runyan
(74) *Attorney, Agent, or Firm* — Karen R. DiDomenicis; Tiffany E. Weksberg

(57) ABSTRACT

Aspects of the invention relate to compositions and methods that are used for remediation of near-wellbore damage. A specific aspect is a composition comprising an olefin sulfonate, a sulfosuccinate, and a chemical selected from the group consisting of an alcohol alkoxylated sulfate, an alcohol alkoxylated carboxylate, or a combination thereof.

7 Claims, 7 Drawing Sheets

(51) Int. Cl.
*C09K 8/03* (2006.01)
*C09K 8/52* (2006.01)

(58) Field of Classification Search
USPC .............................. 166/305.1, 300, 250.01
See application file for complete search history.

(56) References Cited

U.S. PATENT DOCUMENTS

| | | | |
|---|---|---|---|
| 5,488,148 A | | 1/1996 | Weerasooriya et al. |
| 6,173,776 B1 | | 1/2001 | Furman et al. |
| 7,838,467 B2 | | 11/2010 | Jones et al. |
| 8,146,666 B2 | | 4/2012 | Tang |
| 2007/0191633 A1 | * | 8/2007 | Berger ............... C09K 8/584 562/41 |
| 2008/0312108 A1 | * | 12/2008 | Berger ............... C09K 8/584 507/213 |
| 2009/0112014 A1 | | 4/2009 | Campbell et al. |
| 2009/0281003 A1 | * | 11/2009 | Shahin ............... C09K 8/584 507/219 |
| 2011/0048721 A1 | | 3/2011 | Pope et al. |
| 2011/0059872 A1 | | 3/2011 | Weerasoorlya et al. |
| 2012/0241151 A1 | | 9/2012 | Bittner et al. |
| 2013/0196886 A1 | | 8/2013 | Barnes et al. |

FOREIGN PATENT DOCUMENTS

| | | |
|---|---|---|
| GB | 2446539 B | 6/2011 |
| GB | 2457151 B | 5/2012 |
| GB | 2463429 B | 5/2012 |
| GB | 2473362 B | 3/2013 |
| WO | 2012/027757 A1 | 3/2012 |
| WO | 2012/158645 A1 | 11/2012 |
| WO | 2012/173860 A2 | 12/2012 |

OTHER PUBLICATIONS

Darugar, Qusai A., et al.; "Wellbore Remediation Using Microemulsion Technology to Increase Hydrocarbon Productivity"; SPE 160851, Apr. 2012, pp. 1-10.

Wellington, Scott L., et al.; "Low Surfactant Concentration Enhanced Waterflooding"; SPE 30748, vol. 2, Dec. 1997, pp. 389-405.

International Search Report, issued on May 28, 2014 during the prosecution of International Application No. PCT/US2014/025695.

Written Opinion of the International Searching Authority, issued on May 28, 2014 during the prosecution of International Application No. PCT/US2014/025695.

* cited by examiner

COMPOSITION AND METHOD FOR REMEDIATION OF NEAR WELLBORE DAMAGE

RELATED APPLICATIONS

This application claims the benefit of U.S. Provisional Application No. 61/800,386, filed on Mar. 15, 2013, which is incorporated in full by reference.

TECHNICAL FIELD

The present disclosure generally relates to a composition and method for remediation of near wellbore damage. In particular cases, the present disclosure concerns a composition comprising a $C_{20-28}$ internal olefin sulfonate and a chemical selected from the group consisting of a $C_{15-18}$ internal olefin sulfonates, an alcohol alkoxylated sulfate, an alcohol alkoxylated carboxylate, a sulfosuccinate and a combination thereof. The present disclosure also relates to a method of injecting the composition into a well to remediate near wellbore damage.

BACKGROUND

Reservoir systems, such as petroleum reservoirs, typically contain fluids such as water and a mixture of hydrocarbons such as oil and gas. To remove ("produce") the hydrocarbons from the reservoir, different mechanisms can be utilized such as primary, secondary or tertiary recovery processes.

In a primary recovery process, hydrocarbons are displaced from a reservoir through the high natural differential pressure between the reservoir and the bottomhole pressure within a wellbore. The reservoir's energy and natural forces drive the hydrocarbons contained in the reservoir into the production well and up to the surface. Artificial lift systems, such as sucker rod pumps, electrical submersible pumps or gas-lift systems, are often implemented in the primary production stage to reduce the bottomhole pressure within the well. Such systems increase the differential pressure between the reservoir and the wellbore intake; thus, increasing hydrocarbon production. However, even with use of such artificial lift systems only a small fraction of the original-oil-in-place (OOIP) is typically recovered using primary recovery processes as the reservoir pressure, and the differential pressure between the reservoir and the wellbore intake declines overtime due to production. For example, typically only about 10-20% of the OOIP can be produced before primary recovery reaches its limit, either when the reservoir pressure is so low that the production rates are not economical or when the proportions of gas or water in the production stream are too high.

In order to increase the production life of the reservoir, secondary or tertiary recovery processes can be used. Secondary recovery processes include water or gas well injection, while tertiary methods are based on injecting additional chemical compounds into the well, such as surfactants and polymers. Typically in these processes, fluids are injected into the reservoir to maintain reservoir pressure and drive the hydrocarbons to producing wells. An additional 10-50% of OOIP can be produced in addition to the oil produced during primary recovery.

While secondary and tertiary methods of oil recovery can further enhance oil production from a reservoir, care must be taken in choosing the right processes and chemicals for each reservoir, as some methods may cause formation damage or plugging. Damage can occur in the formation even with the careful choice of chemicals during enhanced oil recovery processes. The near wellbore area is especially prone to damage as it is subjected to higher concentrations of enhanced oil recovery chemicals. Additionally, water and steam flooding can cause fines migration which may eventually plug pores, while surfactant flooding can cause a buildup of polymers within the pores of the reservoir. Other near wellbore damage can include changes in wettability due to oil wet solids, such as through the build up in the formation of asphaltenes and paraffin.

SUMMARY

A general embodiment of the disclosure is a composition comprising $C_{20-28}$ internal olefin sulfonate and two or more chemicals selected from the group consisting of $C_{15-18}$ internal olefin sulfonates, an alcohol alkoxylated sulfate, an alcohol alkoxylated carboxylate, and a sulfosuccinate. In certain embodiments, the composition comprises a $C_{20-28}$ internal olefin sulfonate, a sulfosuccinate, and an alcohol alkoxylated sulfate. In specific embodiments, the composition comprises $C_{20-28}$ internal olefin sulfonate, $C_{15-18}$ internal olefin sulfonates, and an alcohol alkoxylated carboxylate. The sulfosuccinate may be sodium dihexyl sulfosuccinate or dianyl sulfosuccinate, and the dihexyl sulfosuccinate can be partially derived from a 4-methyl-2-pentanol feedstock. In embodiments, the alcohol alkoxylated sulfate is TDA-8(PO)-$SO_4^-$, TDA-4(PO)-$SO_4^-$, TDA-12(PO)-$SO_4^-$, or the salt thereof. In certain embodiments, the $C_{20-28}$ internal olefin sulfonate is an isomerized $C_{20-28}$ alpha olefin sulfonate, such as a isomerized $C_{20-28}$ alpha olefin sulfonate comprises about 20-98 percent branching. The composition can further comprise a co-solvent, such as EGBE, isopropyl alcohol, ethanol, n-propyl alcohol, n-butyl alcohol, sec-butyl alcohol, n-amyl alcohol, sec-amyl alcohol, n-hexyl alcohol, sec-hexyl alcohol, polyalkylene alcohol ethers, polyalkylene glycols, poly(oxyalkylene)glycols, or (oxyalkylene)glycols ethers. Each chemical can comprise between 0.5% by weight to 15% by weight of the composition or 0.5% and 3% by weight of the composition. The composition can additionally comprise seawater or produced reservoir brine water.

Another general embodiment is a method for near-wellbore damage remediation comprising injecting into a subterranean reservoir a composition comprising a $C_{20-28}$ internal olefin sulfonate and two or more chemicals selected from the group consisting of a $C_{15-18}$ internal olefin sulfonate, an alcohol alkoxylated sulfate, an alcohol alkoxylated carboxylate, and a sulfosuccinate. The injection of the composition can stimulates the reservoir, such as by improving the relative permeability of the reservoir. The improvement in relative permeability may be by 250% or more. After injection of the composition, the well may be shut-in. In embodiments, injection of the composition remediates damage in the near-wellbore region of the reservoir. In specific embodiments, the temperature of the reservoir is above 55° C. In this case the composition can comprise a $C_{20-28}$ internal olefin sulfonates, an alkali, a $C_{15-18}$ internal olefin sulfonates, and an alcohol alkoxylated carboxylate. In other embodiments, the temperature of the reservoir is below 55° C. In this case, the composition can comprise a $C_{20-28}$ internal olefin sulfonate, an alcohol alkoxylated sulfate, and a sulfosuccinate. The alcohol alkoxylated sulfate can be TDA-8(PO)-$SO_4^-$, TDA-4(PO)-$SO_4^-$, TDA-12(PO)-$SO_4^-$ or the salt thereof. The sulfosuccinate can be sodium dihexyl sulfosuccinate or dianyl sulfosuccinate. The composition can further comprise a co-solvent, such as EGBE, isopropyl alcohol, ethanol, n-propyl alcohol, n-butyl alcohol, sec-butyl alcohol, n-amyl alcohol, sec-amyl alcohol, n-hexyl alcohol, sec-hexyl alcohol, polyalkylene alcohol ethers, polyalkylene glycols, poly(oxyalkylene)glycols, or (oxyalkylene)glycols ethers. Further, the reservoir into which the composition is injected can comprise polymer emulsion damage, such as from a previous chemically enhanced oil recovery flood. The method can further comprise initiating production of the reservoir after injecting the composition.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings.

DETAILED DESCRIPTION

In the enhanced oil recovery process, the addition of surfactants and polymers improves oil recovery significantly. However, the use of these materials over time can build up, causing damage and plugging in the formation near the wellbore. Aspects of the present invention describe a composition and a method for near wellbore damage remediation. Specifically, an embodiment of the invention is a composition comprising a $C_{20-28}$ internal olefin sulfonate and a chemical selected from the group consisting of a $C_{15-18}$ internal olefin sulfonates, an alcohol alkoxylated sulfate, an alcohol alkoxylated carboxylate, a sulfosuccinate and a combination thereof. The present disclosure also relates to a method of injecting the composition into a well to remediate near wellbore damage.

As used herein, the term "equal" refers to equal values or values within the standard of error of measuring such values. The term "substantially equal" or "about" refers to an amount that is within 3% of the value recited.

As used herein, "a" or "an" means "at least one" or "one or more" unless otherwise indicated.

"Effective amount," as used herein, refers to an amount of a component sufficient increase the relative permeability of a wellbore.

"Pore volume" or "PV" fraction as used herein refers to the total volume of pore space in the oil reservoir that is contemplated in a sweep.

"Relative permeability" refers to the ratio of the effective permeability for a particular fluid to a reference or base permeability of the rock. Here, the relative permeability of water in cores is calculated using Darcy's law as follows:

$$k_{rw} = q * \mu * L / (k * A * \Delta P)$$

where $k_{rw}$ is the relative permeability of water, q is the flow rate, $\mu$ is the viscosity, L is the length, k is the brine permeability, A is the cross-sectional area, and $\Delta P$ is the pressure drop. "Near wellbore" refers to the region of the reservoir which is located near to the wellbore in which the damage remediation composition was injected. For example, the near wellbore region could be within a few inches, such as between 2 and 12 inches of the wellbore, within a few feet, such as 1-10 ft, of the wellbore, or within tens of feet, such as 20-50, of the wellbore.

Figure 1:
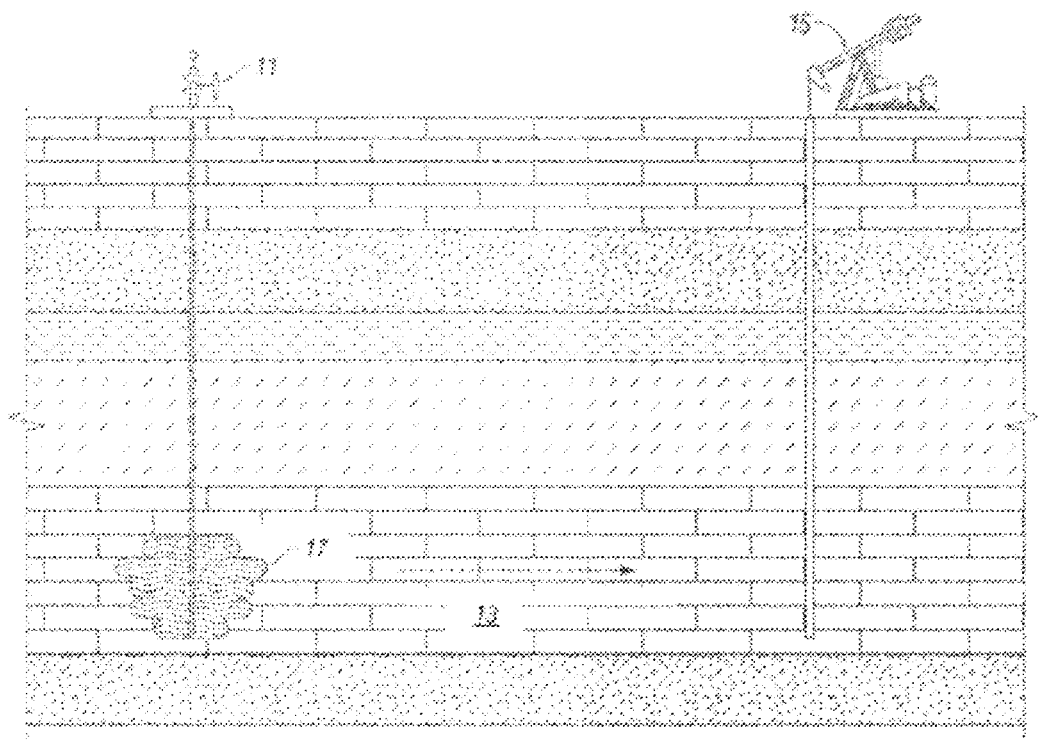
FIG. 1 is an illustration of a damage remediation composition entering a subterranean reservoir.

FIG. 1 illustrates an example subterranean reservoir which includes an injection well 11 which extends to a portion of a subsurface reservoir 13 containing hydrocarbons for production, such that injection well 11 is in fluid communication with subsurface reservoir 13 and the hydrocarbons. Production well 15 is also in fluid communication with reservoir 13 in order to receive the hydrocarbons. Production well 15 is positioned a lateral distance away from injection well 11. While well injection and projection wells are shown in FIG. 1, it should be understood that the method may also be practiced in any type of well. The remediation composition may also be used in a shut-in type procedure. As shown in FIG. 1, the remediation composition 17 is injected through the injection well 11 into reservoir 13.

Remediation Composition

Embodiments of the disclosure are directed to a composition for the remediation of near wellbore damage. The remediation composition comprises a $C_{20-28}$ internal olefin sulfonate and a chemical selected from the group consisting of a $C_{15-18}$ internal olefin sulfonates, an alcohol alkoxylated sulfate, an alcohol alkoxylated carboxylate, a sulfosuccinate and a combination thereof. The remediation composition may be premixed to create a concentrated mixture of the different components. In this case, the remediation composition comprises over 20% each of a $C_{20-28}$ internal olefin sulfonate and a chemical selected from the group consisting of a $C_{15-18}$ internal olefin sulfonates, an alcohol alkoxylated sulfate, an alcohol alkoxylated carboxylate, a sulfosuccinate and a combination thereof. The concentrated composition may be diluted to a lower concentration prior to injecting the remediation composition into a subterranean reservoir. For example, a softened brine water may be used to dilute the components of the composition down to less than 30%, less than 20%, or less than 15% each of the diluted composition. The composition may comprise each chemical component in equal quantities, or the quantities of each component may be different. The remediation compositions may be optimized for a certain reservoir and/or a certain type of damage. For example, a remediation composition for use in a high temperature reservoir may comprise $C_{20-28}$ internal olefin sulfonates and an alcohol alkoxylated carboxylate at a ratio of 1:2. While, in another example, a remediation composition for use in a low temperature reservoir may comprise $C_{20-28}$ internal olefin sulfonates, an alcohol alkoxylated sulfate, and a sulfosuccinate at a ratio of 1:1:1.

Not to be limited by theory, the remediation composition comprises one or more surfactants which dissolve and clean emulsion damage, and a surfactant which solubilizes the emulsion to help flush it away from the wellbore. In a specific embodiment of the invention, the remediation composition comprises three different surfactants, or four or more different surfactants. In an embodiment, the wellbore damage resides in a low temperature reservoir (less than 55° C.) and the emulsion-dissolving surfactants comprise a sulfosuccinate and an alcohol alkoxylated sulfate, while the solubilizing surfactant comprises $C_{20-28}$ IOS. In another embodiment, the wellbore damage resides in a high temperature reservoir (greater than 55° C.) and the remediation composition comprises an alkali, a $C_{15-18}$ IOS, an alcohol alkoxylated carboxylate, and a $C_{20-28}$ IOS. This method of both cleaning and solubilizing emulsion damage in a reservoir not only stimulates the well after the cleanout, but damage to the well after the cleanout with the remediation composition occurs at a slower rate (see Example 5 and FIG. 6).

The amounts of surfactants in the remediation composition can vary. For example, each surfactant in the composition can between 0.1-25%, 0.5-15%, or 1%-5% by weight of the composition. The concentration of the composition usually depends on the volume that is to be injected into the wellbore. For example, if a small volume is injected, the composition may have a higher concentration of surfactants. If a large volume is injected, the composition may have a lower concentration of surfactants. The surfactants are usually comprised in an aqueous solution, such as brine water or softened seawater.

Internal Olefin Sulfonate

As used herein, "internal olefin sulfonates" or "IOS" refers to an unsaturated hydrocarbon compound comprising at least one carbon-carbon double bond and at least one $SO_4^-$ group, or a salt thereof. As used herein, a "$C_{20}$-$C_{28}$ internal olefin sulfonate" or "$C_{20}$-$C_{28}$ IOS" refers to an IOS, or a mixture of IOSs with an average carbon number of 20 to 28, or of 23 to 25. The $C_{20}$-$C_{28}$ IOS may comprise at least 80% of IOS with carbon numbers of 20 to 28, at least 90% of IOS with carbon numbers of 20 to 28, or at least 99% of IOS with carbon numbers of 20 to 28. As used herein, a "$C_{15}$-$C_{18}$ internal olefin sulfonate" or "$C_{15}$-$C_{18}$ IOS" refers to an IOS or a mixture of IOSs with an average carbon number of 15 to 18, or of 16 to 17. The $C_{15}$-$C_{18}$ IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates may be alpha olefin sulfonates, such as an isomerized alpha olefin sulfonate. The internal olefin sulfonates may also comprise branching. In certain embodiments, $C_{15}$-$C_{18}$ IOS may be added to the wellbore remediation composition when used in high temperature reservoirs, such as reservoirs above 55° C. The IOS may be at least 20% branching, 30% branching, 40% branching, 50% branching, 60% branching, and 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In embodiment of the disclosure, the IOS comprises 0.1-15% by weight of the wellbore remediation composition to be injected into a reservoir. In certain embodiments of the disclosure the IOS comprises 0.5% to 5% by weight of the wellbore remediation composition. In a specific embodiment, the IOS comprises about 1% by weight of the wellbore remediation composition.

Figure 5:
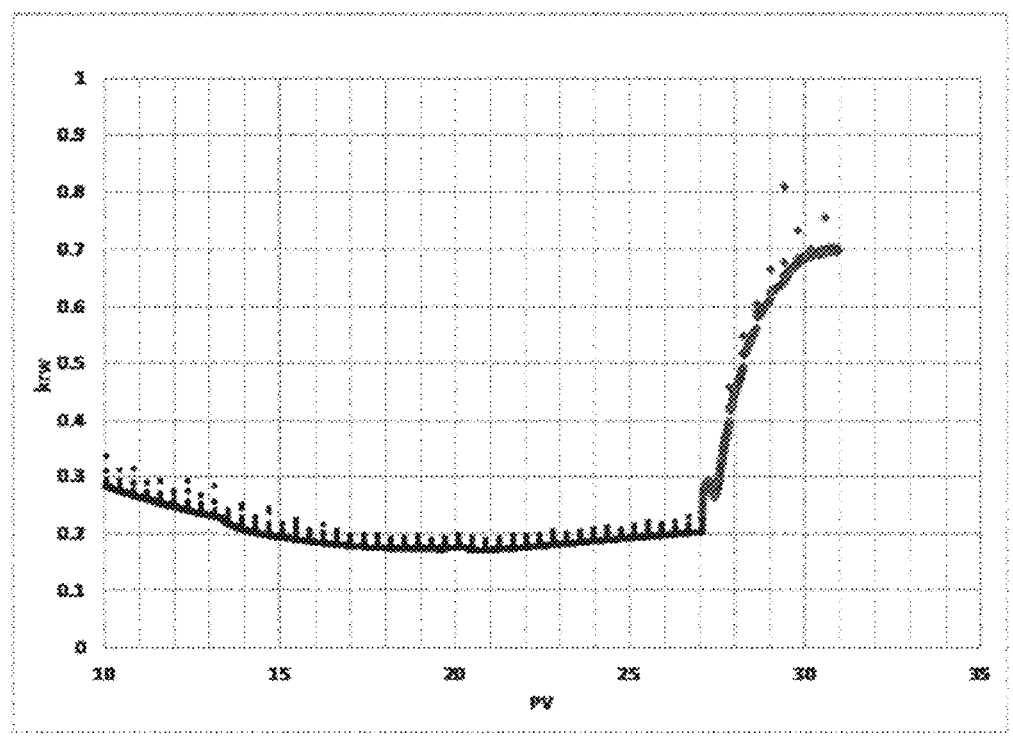
FIG. 5 is a graph showing relative permeability per pore volume injected of a core flood. The squares represent the injection of a polymer solution, while the diamonds represent the injection of a remediation composition of the disclosure.

As disclosed here, $C_{20}$-$C_{28}$ IOS solubilizes crude oil and the addition of a $C_{20}$-$C_{28}$ IOS acts synergistically with emulsion-dissolving surfactants to remove damage to a formation and to stimulate a reservoir. Example 1 and FIG. 5 illustrate the synergistic response of including $C_{20}$-$C_{28}$ IOS in a remediation composition with emulsion-dissolving surfactants. The composition of the $C_{15}$-$C_{18}$ IOS is generally tailored to the conditions of the reservoir needing damage remediation.

Alcohol Alkoxylated Sulfate

Embodiments of the disclosure include the addition of an alcohol alkoxylated sulfate in the remediation composition. The alcohol alkoxylated sulfate has the general structure of alcohol-PO/EO-$SO_4^-$, or a salt thereof. The alcohol group comprises 10-32 carbon atoms, and in specific embodiments comprises between 16 to 32, 13 to 17, or 10 to 13 carbon atoms. In embodiments of the invention the PO/EO group comprises 0-50 ethylene oxide groups, 0-50 propylene oxide groups, or combinations thereof. The alcohol alkoxylated sulfate may be the salt of the alcohol alkoxylated sulfate, such as a sodium alcohol alkoxylated sulfate. In specific embodiments of the invention the alcohol alkoxylated sulfate is a tridecyl-8(propylene oxide)-sulfate (TDA-8(PO)-$SO_4^-$). In other embodiments of the invention the alcohol alkoyxlated sulfate is TDA-4(PO)-$SO_4^-$, or TDA-12(PO)-$SO_4$. The alcohol alkoxylated sulfate may be a pure chemical or may be a mixture of different alcohol alkoxylated sulfates.

In embodiment of the disclosure, the alcohol alkoxylated sulfate comprises 0.1-15% by weight of the wellbore remediation composition to be injected into a reservoir. In certain embodiments of the disclosure the alcohol alkoxylated sulfate comprises 0.5% to 5% by weight of the wellbore remediation composition. In a specific embodiment, the alcohol alkoxylated sulfate comprises about 1% by weight of the wellbore remediation composition. In some embodiments, the alcohol alkoxylated sulfate is used in a remediation composition in a low temperature reservoir, such as reservoirs that are below 55° C. The specific alcohol alkoxylated sulfate used is generally tailored to the conditions of the reservoir needing damage remediation.

Alcohol Alkoxylated Carboxylate

Embodiments of the invention include the addition of an alcohol alkoxylated carboxylate in the remediation composition. The alcohol alkoxylated carboxylate has the general structure of alcohol-PO/EO-$COO^-$, or a salt thereof. The alcohol group comprises 10-32 carbon atoms, and in specific embodiments comprises between 16 to 32, 13 to 17, or 10 to 13 carbon atoms. In embodiments of the invention the PO/EO group comprises 0-50 ethylene oxide groups, 0-50 propylene oxide groups, or combinations thereof. The alcohol alkoxylated carboxylate may be a pure chemical or may be a mixture of different alcohol alkoxylated carboxylate In embodiment of the disclosure, the alcohol alkoxylated carboxylate comprises 0.1-15% by weight of the wellbore remediation composition to be injected into a reservoir. In certain embodiments of the disclosure the alcohol alkoxylated carboxylate comprises 0.5% to 5% by weight of the wellbore remediation composition. In a specific embodiment, the alcohol alkoxylated carboxylate comprises about 1% by weight of the wellbore remediation composition. The alcohol alkoxylated carboxylate may be added to the composition when used high temperature reservoirs, such as reservoirs above 55° C. The specific alcohol alkoxylated carboxylate used is generally tailored to the conditions of the reservoir needing damage remediation.

Sulfosuccinate

As used herein, "sulfosuccinate" refers to a chemical having the structure:

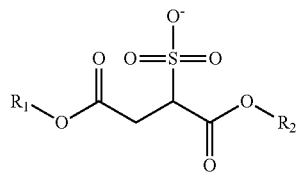

or a salt thereof, wherein $R_1$ is a branched or unbranched carbon chain comprising 5 to 7 carbon atoms and wherein $R_2$ is a branched or unbranched carbon chain comprising 5 to 7 carbon atoms. In embodiments of the disclosure, the sulfosuccinate is a sulfosuccinate salt, such as a sodium sulfosuccinate. In an embodiment, the sulfosuccinate is sodium dihexyl sulfosuccinate, which are considered food grade, environmentally friendly compounds. In a specific embodiment, the dihexyl sulfosuccinate has the following chemical structure:

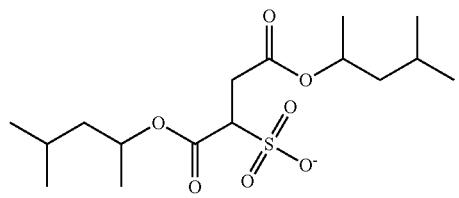 [SMILES: CC(C)CC(C)OC(=O)CC(C(=O)OC(C)CC(C)C)S(=O)(=O)[O-]]

In embodiment of the disclosure, the sulfosuccinate comprises 0.1-15% of the remediation composition to be injected into a wellbore. In certain embodiments of the disclosure the sulfosuccinate comprises 0.5% to 5% of the remediation composition. In a specific embodiment of the invention, the sulfosuccinate comprises about 1% of the remediation composition. The sulfosuccinate may be added to the remediation composition when used in low temperature reservoirs, such as reservoirs below 55° C. Sulfosuccinates are commercially available chemicals, for example, sodium dihexyl sulfosuccinates are available from Cytec (MA-80-I, for example). In an embodiment of the disclosure, the dihexyl sulfosuccinate is partially derived from a 4-methyl-2-pentanol feedstock. The specific sulfosuccinate used is generally tailored to the conditions of the reservoir needing damage remediation.

Additional Components

The remediation composition described throughout this disclosure may include additional additives, such as alkali, chelators, co-solvents, polymers, and electrolytes. Chelators may be used to soften the water in the solution or to reduce scaling in the formation. Examples of chelators include ethylenediaminetetraacetic acid (EDTA) which can also be used as an alkali, methylglycinediacetic acid (MGDA). The amount of chelant may be selected based on the amount of multivalent ions in the reservoir. For example, chelating agents can be used a 10:1 molar ratio with divalent cations such as calcium or magnesium. Other chelating agents may work depending on the brine composition and the desired pH.

Co-solvents may also be included in the slug compositions. Suitable co-solvents are alcohols, such as lower carbon chain alcohols like isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene) glycols ethers or any other common organic co-solvent or combinations of any two or more co-solvents. For example, in an embodiment, an ether, ethylene glycol butyl ether (EGBE), is used and typically is about 0.75 to 1.5 times the concentration of total surfactant in the remediation composition. Generally, the co-solvent, such as EGBE, when used may be present in an amount of about 0.5 to about 6.0 by weight percent of the solution to be injected into the reservoir, such as from about 0.5 to about 4.0 by weight %, or about 0.5 to about 3 by weight %. In a specific embodiment, the composition comprises 3.5% EGBE.

In one embodiment, alkali may be added to the remediation composition. The alkali employed is a basic salt of an alkali metal from Group IA metals of the Periodic Table. In an embodiment, the alkali metal salt is a base, such as an alkali metal hydroxide, carbonate or bicarbonate, including, but not limited to, sodium carbonate, sodium bicarbonate, sodium hydroxide, potassium hydroxide, sodium silicate, tetrasodium EDTA, sodium metaborate, sodium citrate, sodium tetraborate. The alkali is typically used in amounts ranging from about 0.3 to about 5.0 weight percent of the solution, such as about 0.5 to about 3 wt. %. In embodiments, alkali is used in high temperature reservoirs, such as reservoirs above 55° C.

Water soluble polymers, such as those commonly employed for enhanced oil recovery, can be included to control the mobility of the injection solution, such as through a polymer drive injected after the remediation composition or may be included within the composition. Such polymers include, but are not limited to, biopolymers such as xanthan gum and scleroglucan and synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS) and N-vinyl pyrrolidone (NVP). Molecular weights (Mw) of the polymers range from about 100,000 Daltons to about 30,000,000 Daltons, such as about 100,000 to about 500,000, or about 1,000,000 to about 20,000,000 Daltons. In specific embodiments of the invention the polymer is about 2,000,000 Daltons, about 8,000, 000 Daltons, or about 20,000,000 Daltons. The polymer and the size of the polymer can be tailored to the permeability, temperature and salinity of the reservoir.

EXAMPLES

The following examples are included to demonstrate specific embodiments of the disclosure. It should be appreciated by those of skill in the art that the techniques disclosed in the examples that follow represent techniques discovered by the inventors to function well in the practice of the invention, and thus, can be considered to constitute modes for its practice. However, those skilled in the art should, in light of the present disclosure, appreciate that many changes can be made in the specific embodiments disclosed and still obtain a like or similar result without departing from the scope of the invention.

Example 1

It was necessary to ensure that polymer alone was not detrimental to relative permeability, so a baseline was obtained using powder polymer instead of emulsion polymer. All core flood experiments described throughout were conducted according to known laboratory methods for reservoir cores. The core flood was set up using a reservoir sand pack, which was brine flooded, then oil flooded to initial oil saturation. After oil flooding, a secondary polymer flood was conducted using 2000 ppm powder polymer for 1.3 PV. After polymer flood, the relative permeability was calculated as 0.33 which suggested that polymer alone was not contributing to a decrease in relative permeability. Next, it was necessary to study the effects of the emulsion-dissolving surfactants in the absence of mineral oil so a composition comprising 1% sodium dihexyl sulfosuccinate, 1% TDA-4PO-$SO_4$, and 2000 ppm powder polymer (no $C_{20}$-$C_{28}$ IOS) was injected into the core for about 2 PV (FIG. 5, first arrow). The injection of only the sulfosuccinate and the alcohol alkoxylated sulfate resulted in essentially no change in krw which led to the conclusion that a third surfactant (responsible for solubilizing the crude oil) should be added to the solution. A solution of 1% by weight sodium dihexyl sulfosuccinate, 1% by weight TDA-8PO-SO4, 1% by weight $C_{20}$-$C_{28}$ IOS, and 2000 ppm powder polymer was injected which showed an immediate increase in the relative permeability of the core and an additional gradual increase (FIG. 5, second arrow) of over 2.5 PV. The injection of the second composition resulted in an increase of krw by greater than a factor of 2.

Example 2

Figure 2:
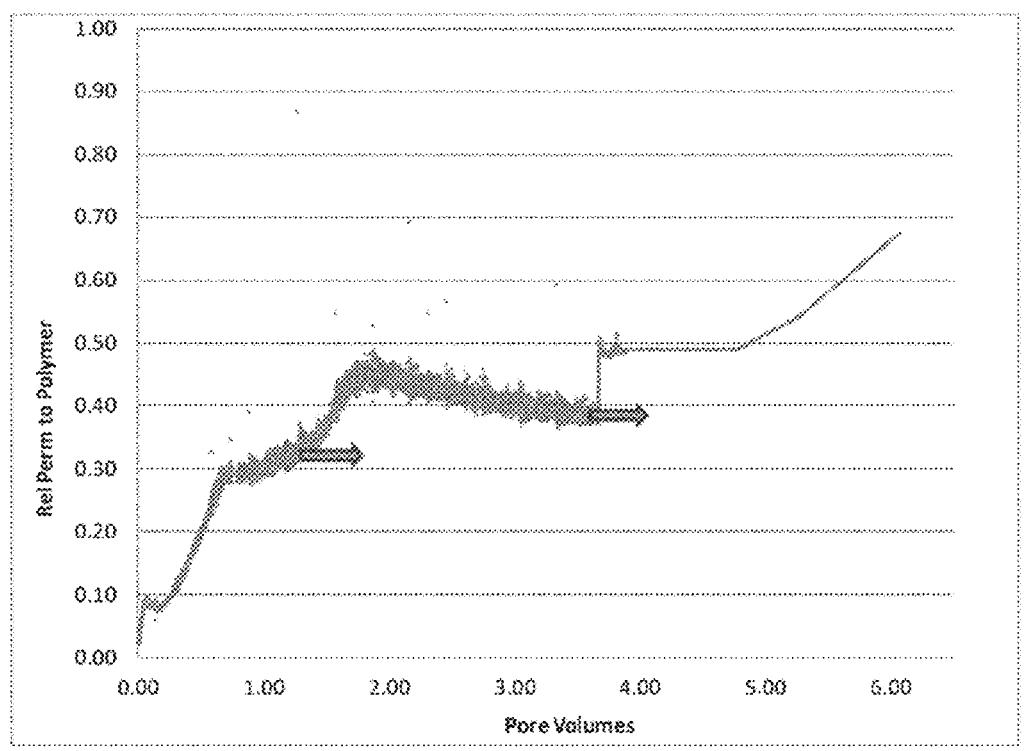
FIG. 2 is a graph showing relative permeability per pore volume injected of a core flood. The first arrow indicates the injection of a remediation composition without $C_{20}$-$C_{28}$ IOS, while the second arrow indicates the injection of a remediation composition with $C_{20}$-$C_{28}$ IOS.

The core flood was set up using a reservoir sand pack, which was brine flooded, then oil flooded to initial oil saturation. After oil flooding, polymer flooding with 2000 ppm emulsion polymer (to simulate field conditions) began. After a krw of 0.18 was reached (at 11.2 PV), a remediation composition comprising 1% by weight sodium dihexyl sulfosuccinate, 1% by weight TDA-8PO-$SO_4$, 1% by weight $C_{20}$-$C_{28}$ IOS, 3.5% by weight EGBE (used to reduce microemulsion viscosity), and 4000 ppm emulsion polymer (increased concentration for more favorable mobility ratio) was injected into the core. The relative permeability was calculated (from recorded pressure) over the whole process and shown in FIG. 2. The remediation composition achieved a krw of 0.6 (at 14.5 PV) after starting at a damage relative permeability of 0.18 (at 11.2 PV).

Example 3

Figure 3:
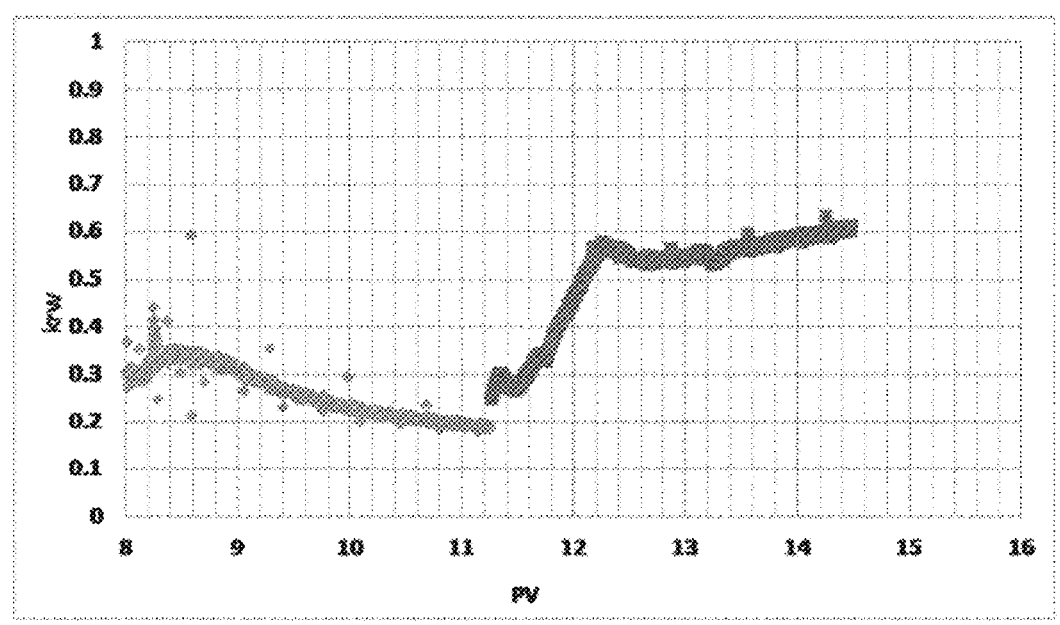
FIG. 3 is a graph showing relative permeability per pore volume injected of a core flood. The diamonds represent the injection of a polymer solution, while the squares represent the injection of a remediation composition of the disclosure.

This core flood was performed to show the effectiveness of the remediation composition in the absence of high reservoir oil saturation and without emulsion polymer damage. The weathered oil from an active sand type reservoir was cleaned off for 5 PV using a remediation composition comprising 1% sodium dihexyl sulfosuccinate by weight, 1% TDA-8PO-$SO_4$ by weight, 1% $C_{20}$-$C_{28}$ IOS by weight, 3.5% by weight EGBE, and 4000 ppm emulsion polymer resulting in a krw of ~0.95 (from 0-5 PV). After which the core was injected with emulsion polymer and damaged for 15 more PVs until the krw=0.18 (5-20 PV). The same remediation composition was again injected into the core and achieved a krw of 0.73 (20-24 PV). FIG. 3 illustrates the krw over PV injected for the described series.

Example 4

Figure 4:
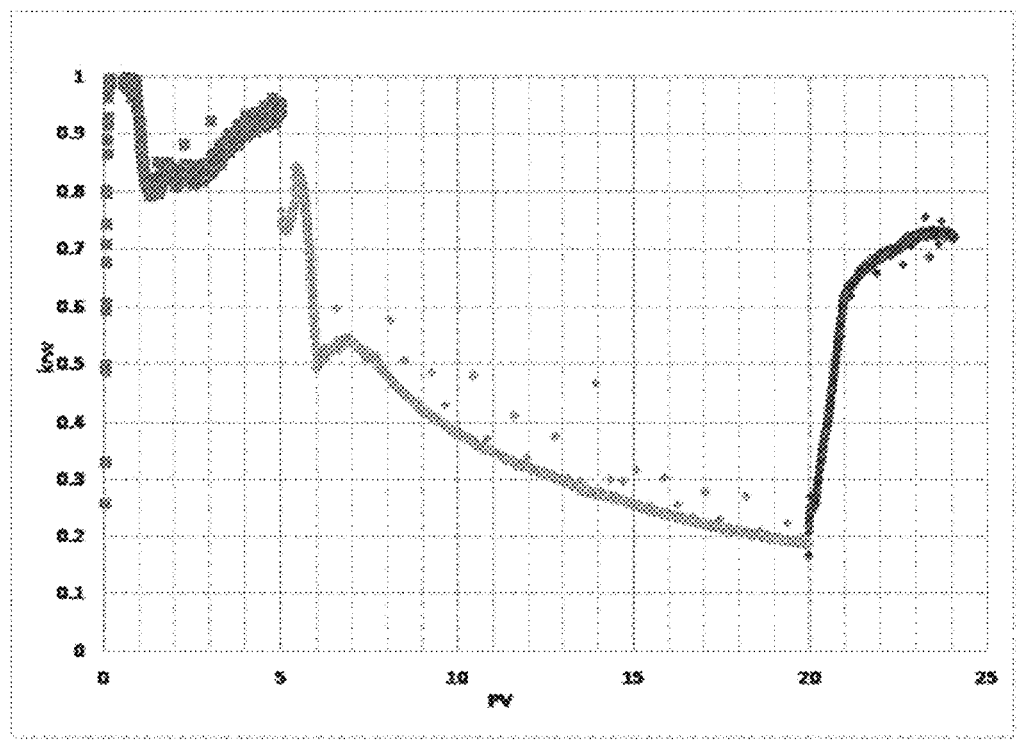
FIG. 4 is a graph showing relative permeability per pore volume injected of a core flood. The squares at 0-5 PVs represent the injection of a remediation composition of the disclosure, while the diamonds at 5-20 PV represent the injection of a polymer solution, and the diamonds from 20-24 PV represent the injection of a remediation composition of the disclosures.

The core flood was set up using a reservoir sand pack, which was brine flooded, then oil flooded to initial oil saturation. After oil flooding, the core was damaged for 27 PVs with emulsion polymer to a krw of 0.2. After which a remediation composition comprising 1% sodium dihexyl sulfosuccinate, 1% TDA-BPO-$SO_4$ by weight, 1% $C_{20}$-$C_{28}$ IOS by weight, 3.5% EGBE by weight, and emulsion polymer was injected into the core and achieved a krw of 0.7. FIG. 4 illustrates the krw over PV injected for the described series, with the injection of the surfactant composition starting at 27 PVs.

Example 5

Figure 6:
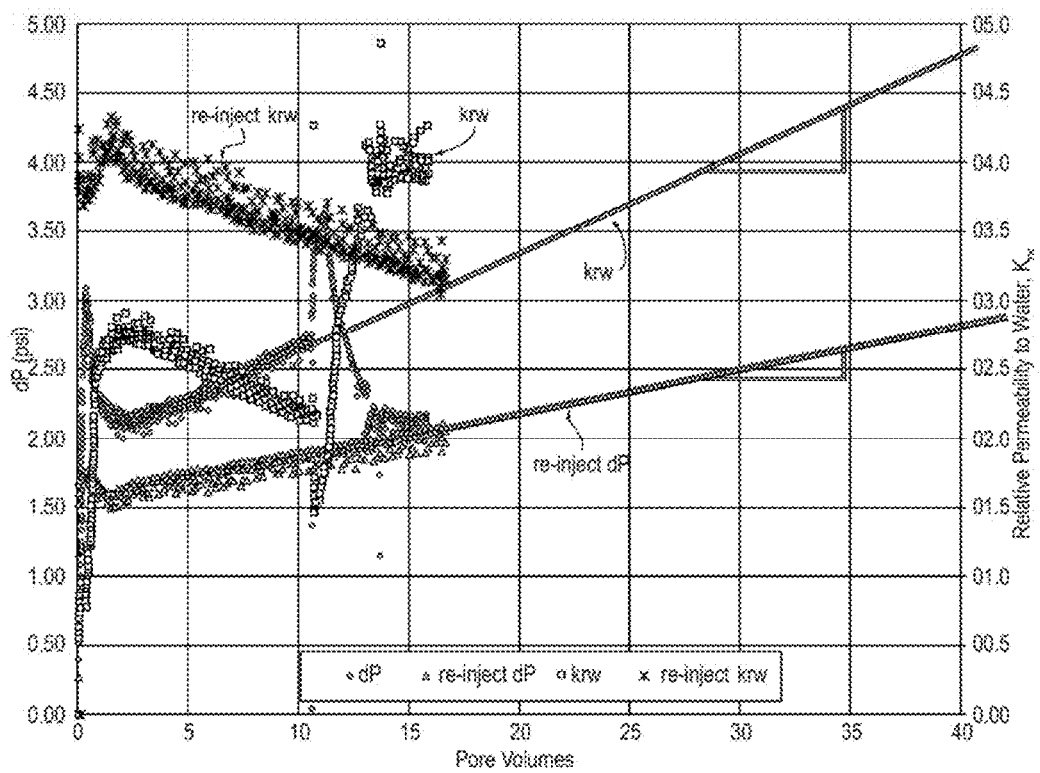
FIG. 6 is a graph showing the change in the relative permeability per pore volume injected of a core flood.
Figure 7:
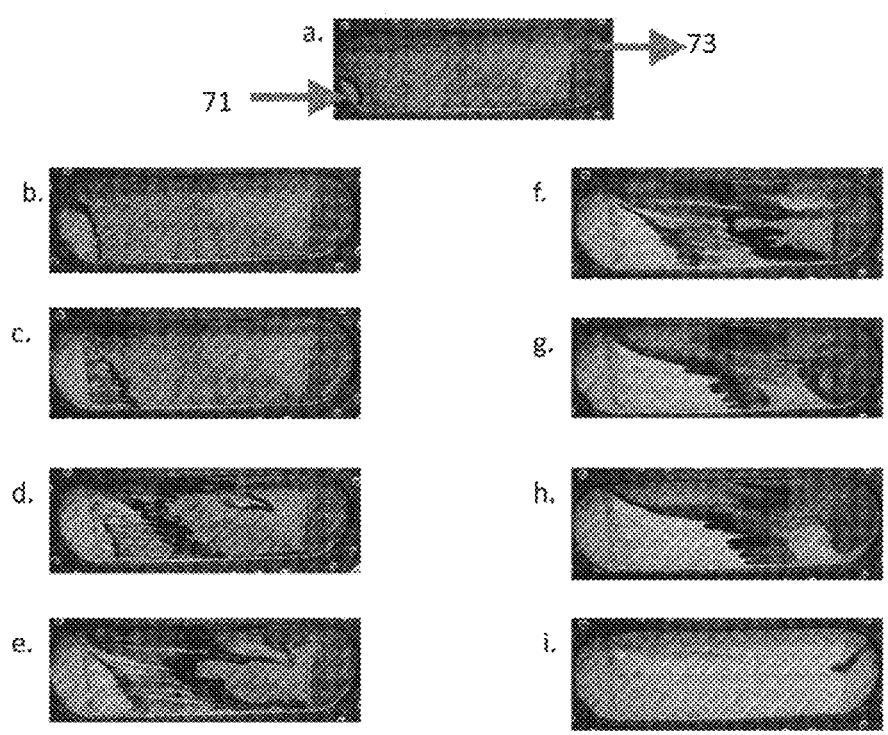
FIG. 7a-i are snapshots taken after injecting a remediation composition of the present disclosure into a fish tank core flood.

The core flood was set up using a reservoir sand pack, which was brine flooded, then oil flooded to initial oil saturation. After oil flooding, 10.5 PV of 2000 ppm emulsion polymer was injected to plug the core to a krw of 0.22 (FIG. 6, diamonds). After which 5 PV of a remediation composition with 1% by weight TDA-8(PO)-$SO_4$, 1% by weight sodium dihexyl sulfosuccinate, and 1% by weight $C_{20}$-$C_{28}$ IOS was injected. After the remediation composition, another 2000 ppm polymer was injected. FIG. 6 shows the change in krw as the different components were injected. The second injection of polymer which occurred after the injection of the remediation composition shows about a 0.5 decrease in the change of relative permeability (about half the rate of damage). This core flood demonstrates that the core is damaged at a slower rate after a remediation composition of the disclosure was used to clean it out.

Example 6

A "fish tank" core flood was set up using reservoir sand flooded with 300 cP of reservoir oil. The core was water flooded for 3.5 PV (ROS=0.5), and then polymer flooded (45 cP) for 1 PV (ROS=0.25). After which snapshots were taken during a flood with a remediation composition containing 1% by weight TDA-8(PO)-$SO_4$, 1% by weight sodium dihexyl sulfosuccinate, 1% by weight $C_{20}$-$C_{28}$ IOS, and 3.5% EGBE. A 0.2 PV (100 cP) slug of the remediation composition was injected, which was followed by a 1.3 PV polymer drive (100 cP) at an injection rate of 1 ft/day. FIGS. 7*a-i* are snapshots that were taken during the injection of the remediation composition and the polymer drive. The slugs were injected into the core at the injector 71 and removed at the producer 73.

Although the present invention and its advantages have been described in detail, it should be understood that various changes, substitutions and alterations can be made herein without departing from the scope of the invention as defined by the appended claims. Moreover, the scope of the present disclosure is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

REFERENCES

SPE 129766. Julian R. Barnes, Henk Dirkzwager, Jasper R. Smit, Johan P. Smit, An On, Reinaldo C. Navarrete and Bob H. Ellison, and Marten A. Buijse. "Application of internal olefin sulfonates and other surfactants to EOR. Part 1: Structure—Performance relationships for selection at different reservoir conditions." SPE Improved Oil Recovery Symposium, 24-28 Apr. 2010, Tulsa, Okla., USA U.S. Pat. No. 5,488,148
U.S. Patent Application Publication 2009/0112014

What is claimed is:

1. A method for remediation of existing damage in a region near an injection wellbore in communication with a subterranean reservoir wherein the injection wellbore is not intended for receiving hydrocarbons and wherein the existing damage is caused by previous injection of a composition containing a polymer emulsion into the injection wellbore, the method comprising injecting into the subterranean reservoir a composition comprising an emulsion polymer, a $C_{20}$ internal olefin sulfonate, a $C_{15-18}$ internal olefin sulfonate, and an alcohol alkoxylated carboxylate, thereby dissolving, cleaning and/or flushing the polymer emulsion away from the injection wellbore.

2. The method of claim 1, wherein the injection of the composition stimulates the region near the injection wellbore in communication with the subterranean reservoir.

3. The method of claim 1, wherein the injection improves the relative permeability of the region near the injection wellbore in communication with the subterranean reservoir.

4. The method of claim 3, wherein the relative permeability of the region near the injection wellbore in communication with the subterranean reservoir is increased by at least 250 percent.

5. The method of claim 1, wherein the temperature of the region near the injection wellbore in communication with the subterranean reservoir is above 55° C.

6. The method of claim 5, wherein the composition further comprises an alkali.

7. The method of claim 1, further comprising a co-solvent.

* * * * *